May 20, 1941.　　M. T. CARPENTER　　2,242,390
CATALYTIC APPARATUS
Filed Dec. 11, 1937
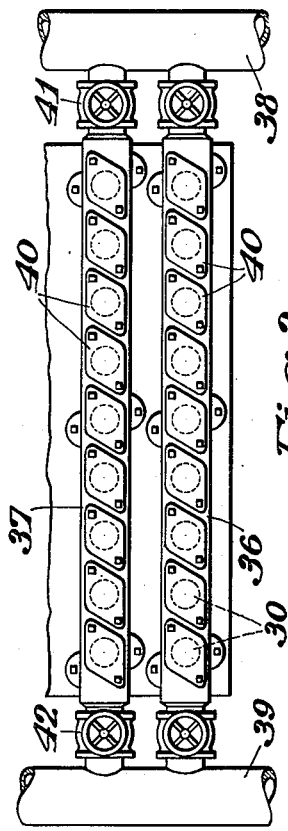
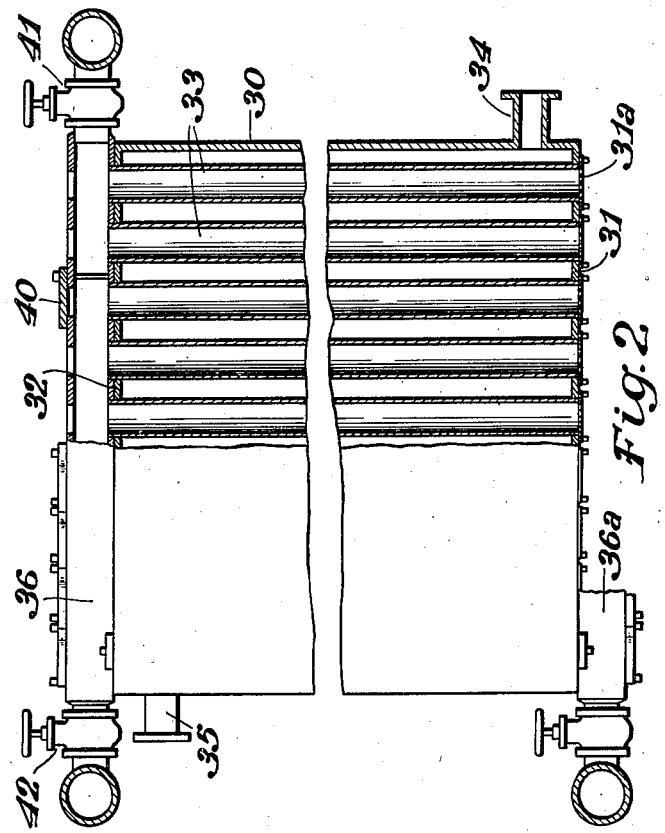
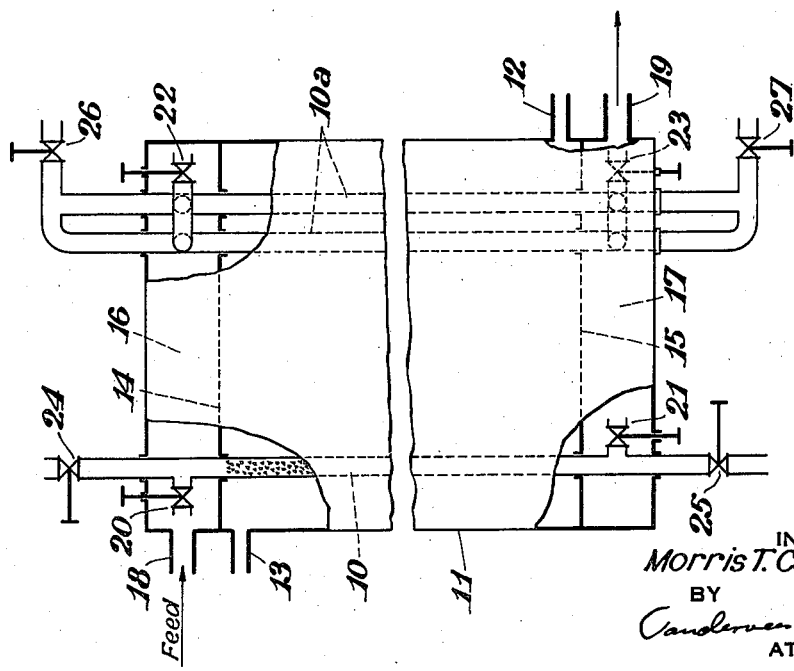
INVENTOR
Morris T. Carpenter
BY
ATTORNEY

UNITED STATES PATENT OFFICE 2,242,390

CATALYTIC APPARATUS

Morris T. Carpenter, Chicago, Ill., assignor to Standard Oil Company, Chicago, Ill., a corporation of Indiana Application December 11, 1937, Serial No. 179,298

9 Claims. (Cl. 196—52)

This invention relates to the conversion of hydrocarbons and more particularly to the conversion of heavier hydrocarbons such as gas oil, etc., to gasoline. The invention relates more specifically to an apparatus for conducting catalytic conversion reactions wherein the temperature of the reaction may be closely controlled. One of the objects of the invention is to produce gasoline of higher knock rating than that obtainable by ordinary pyrolysis. Another object of the invention is to provide an apparatus for converting hydrocarbons by means of catalysts maintained at elevated temperatures under controlled conditions of temperature whereby the reaction can be more closely controlled than has heretofore been possible. Still another object of the invention is to provide an apparatus for catalytic conversion of hydrocarbons wherein the catalyst may be revivified with close temperature control and with utilization of the exothermic heat of revivification. Other objects of the invention will be apparent from the following description thereof.

The invention is illustrated by a drawing which forms a part of this specification and shows diagrammatically two forms of the apparatus. Figure 1 is an elevation partly in section showing one modification of the invention which is somewhat more diagrammatic than another modification shown in Figures 2 and 3. Figure 2 is an elevation partly cut away to show the arrangement of the catalyst tubes and one of the headers. Figure 3 is a partial plan view of the apparatus shown in Figure 2.

Referring to Figure 1 of the drawing, catalyst tubes 10 and 10a are arranged within shell 11 provided with inlet 12 and outlet 13, for introducing heating or cooling fluids into external contact with the catalyst tubes. The tubes 10 and 10a are securely fastened into header plates 14 and 15 which define header spaces 16 and 17 at the ends of chamber 11, the tubes 10 and 10a being securely sealed into the header plates 14 and 15 and into the ends of the chamber 11 to prevent leakage of gases from the header spaces 16 and 17 into the interior of chamber 11 or into the atmosphere. Pipe connections to header spaces 16 and 17 are provided as shown at 18 and 19.

Tubes 10 are provided with valved openings 20 and 21 communicating with the header spaces 16 and 17 and controllable from without the chamber 11. The drawing illustrates an extended valve stem for this purpose, but various other means may be provided for operating the valves opening and closing the passages 20 and 21, such as hydraulic pressure controls, etc. Each catalyst tube may be provided with separately controlled openings 20 and 21 or, if desired, the tubes may be arranged as shown by 10a in groups which are connected to the header spaces by a single valve as shown at 22 and 23. The advantage of the latter is that fewer valves are required and tubes may be arranged in the chamber 11 in more compact form.

Each tube 10 may be provided with valves or blinds 24 and 25 located externally of the shell 11. Where catalyst tubes are arranged in groups external headers may be provided to reduce the number of valves required for closing the ends of the tubes as shown at 26 and 27.

In the operation of my improved catalyst apparatus each tube is charged with the desired catalyst which may be fuller's earth, aluminum silicate, boron silicate, aluminum oxide, etc., in the case of cracking reactions, the catalyst being confined largely within the section of the tubes between plates 14 and 15. With valves 24 and 25 closed and valves 20 and 21 open preheated gas oil vapors may be introduced by line 18, pass into the tubes 10 through openings 20 and thence through the catalyst within the tubes and out through opening 21 leading to header space 17 and outlet 19. In the cracking of gas oil the vapors may be introduced at a temperature of about 800 to 950° F. and preferably about 850 to 900° F. The temperature of the catalyst within the tubes is maintained uniform as desired by circulating the heating fluid around the tubes. For example, superheated steam, mercury vapor or diphenyl vapor at the desired temperature of, for example, 850° F. may be introduced through line 13 and withdrawn through line 12. By employing mercury vapor or other high boiling material for this purpose I may suitably maintain sufficient pressure within chamber 11 to keep the vapor saturated, thus permitting condensation of liquid mercury within chamber 11 which may be drawn off through outlet 12 and revaporized in a suitable mercury boiler not shown. I am thus enabled to maintain any desired catalyst temperature by employing relatively small diameter tubes 10, thus providing for the endothermic heat of reaction of the hydrocarbons undergoing cracking in the presence of the catalyst. I prefer to force the gas oil vapors through the catalyst at a high velocity and thus limit the time of contact between the hydrocarbons and the catalyst to a period of 1 to 10 seconds. Shorter or longer times of contact, however, may be employed without departing from the sphere of the invention. By accurately controlling the temperature surrounding the tubes 10 I find it unnecessary to superheat the vapors charged thereto. Thus I find I can conduct the cracking reaction at lower initial temperatures than has heretofore been the practice, thereby producing less decomposition of hydrocarbons to form objectionable carbonaceous deposits which shorten the life of the catalyst.

After the hydrocarbons have passed through the catalyst for a period of time, which may be several hours or days, the catalyst loses its activity, which fact may be ascertained by withdrawing a sample of the vapors at valve 25. When this has occurred I may isolate any one or more of tubes 10 by closing valves 20 and 21. I may then withdraw the catalyst from the isolated tube or tubes and replace it with fresh catalyst, after which the refilled tubes are again put in service by opening valves 20 and 21. However, I prefer to revivify the catalyst in situ by introducing an oxygen-containing gas through valve 24, exhausting the spent gases through valve 25. For this purpose I may use air, but I prefer to employ air diluted with inert gases such as steam or flue gas to slow down the rate of oxidation. The oxygen containing gas is preferably preheated to a lower temperature than that of the reaction chamber 11 before introducing it into the tubes 10. At the temperatures of the reaction, oxygen removes the deposited carbonaceous material from the catalyst, leaving the catalyst in an active condition for further reaction. This process of revivification is accompanied by the liberation of a considerable amount of heat which escapes through the walls of the tubes 10 into the fluid surrounding them where mercury is employed as the ambient fluid. Liquid mercury may be vaporized from the surfaces of the tubes 10 and mercury vapor thus produced may be withdrawn through connection 13 for use elsewhere, for example in a mercury turbine for the generation of power. For smooth operation of the apparatus I prefer to employ a battery of units connected in parallel with a mercury boiler, thus providing a steady supply of mercury vapor for power purposes.

Part of the heat generated in the catalyst tubes undergoing revivification is utilized to maintain the temperature of surrounding tubes in which hydrocarbons are being treated at the same time and thus part of the exothermic heat of regeneration is usefully employed in supplying the endothermic heat of hydrocarbon conversion. In the case where two or more catalyst tubes are operated in parallel as shown at 10a, the manner of regeneration is the same as just described.

In another modification of my invention I may employ the apparatus shown in Figures 2 and 3. Referring to Figure 2, the shell or chamber 30, which may be rectangular, is provided with header plates 31 and 32 at opposite ends. Between the headers 31 and 32 are parallel banks of tubes 33 arranged in rows. Inlet and outlet connections 34 and 35 are provided for admitting heating or cooling fluid to the space in the shell 30 surrounding the catalyst tubes 33. Connections to the ends of the catalyst tubes are made by bolted manifolds 36, 37, etc., which are connected at alternate ends to supply lines 38 and 39 for admitting hot gas oil vapors and hot air respectively. Similar manifolds (shown broken at 36a) are provided adjacent to plate 31 at the opposite end of the chamber 30. Perforated plates 31a are provided to support the catalyst. The manifolds may be provided with cover plates 40 to permit access to one or more of the catalyst tubes without removing the entire manifold. Thermocouples for indicating catalyst temperature (not shown) may suitably be introduced through the cover plates 40 and by removing the cover plates the catalyst may be discharged and replenished. However, I may omit the cover plates and remove the entire manifold for this purpose when necessary.

Valves 41 are provided to shut off the supply of gas oil vapors to the manifolds and valves 42 are similarly provided to introduce and shut off the supply of heated air. In conducting the cracking operation, heated gas oil vapor, for example, at 850° F. may be introduced into manifold 36 while heated air is simultaneously introduced into manifold 37, etc., for revivifying spent catalyst in the tubes connected thereto. The heat developed in the alternate banks of tubes during revivification is partly conducted and partly radiated to the adjoining tubes which are operating on the cracking portion of the cycle, thereby effecting considerable economy in heat. Furthermore, excess heat above that required for the cracking operation is employed to heat the temperature regulating fluid within the shell 30, and the heated fluid, for example mercury vapor, may be conducted through outlet 35 to a suitable power generating machine or it may be used in processing other materials. When the catalyst has been restored by the burning process, the valves may be reversed and the operation repeated with the other tubes.

Although I have described my catalytic treating apparatus in connection with certain operations, particularly the pyrolysis of hydrocarbons in the manufacture of gasoline, it should be understood that the apparatus may also be employed in other catalytic processes where temperature control of the catalyst is essential to the success of the process. For example, I may treat straight-run virgin gasolines of low knock rating, virgin naphtha, etc., to increase the antiknock value for motor fuels. I may simultaneously crack or reform hydrocarbons in admixture with hydrocarbon gases such as ethane, propane, butane and the corresponding olefins, whereby the gases are combined with the heavier hydrocarbons to produce valuable motor fuel. I may also add hydrogen and/or hydrocarbon gases to gas oil or a heavy residual oil undergoing cracking in order to reduce the carbon formation and increase the length of runs in the catalyst apparatus. My apparatus may also be used for other reactions such as dehydrogenation, dehydration, etc., employing catalysts such as chromium oxide, zinc oxide, thorium oxide, molybdenum sulfide, etc. My apparatus may also be used for the polymerization of unsaturated hydrocarbon gases, for example ethylene, propylene and butylene in which the exothermic reaction heat is readily controlled in the manner herein described. The apparatus may be constructed of ordinary steel or alloy steels such as 18—8 chrome-nickel steel, chromel, etc. The shell of the apparatus may be rectangular as shown or cylindrical in case it is required to withstand pressure as in the generation of high pressure steam.

Having thus described my invention, what I claim is:

1. An apparatus for conducting catalytic gas reactions wherein the catalyst is rendered inactive and is revivified by treatment with an oxidizing gas, comprising a plurality of catalyst tubes in direct thermal communication arranged in parallel within a single container, a header space at each end of said container to introduce and withdraw hydrocarbon vapors undergoing treatment, means for independently communicating and discommunicating selected tubes with said header spaces without interrupting the reaction in adjacent tubes and means for passing an oxidizing gas through said tubes when out of communication with said header spaces.

2. The apparatus described in claim 1 wherein said header space communicating and discommunicating means is provided for each individual catalyst tube.

3. The apparatus described in claim 1 wherein said header space communicating and discommunicating means is provided for groups of catalyst tubes.

4. In an apparatus for the conversion of hydrocarbon oils into gasoline of high knock rating, wherein the vapor of said oil is heated to an elevated temperature, above 800° F., and subjected to the action of a catalyst, whereupon an endothermic conversion of said oils takes place, with the deposition of carbonaceous matter on said catalyst, the improvement comprising means for disposing said catalyst in parallel, vertical, elongated passages of narrow cross section, hereinafter called catalyst tubes in direct radiant thermal communication, a single chamber surrounding said catalyst tubes, means for forcing said hydrocarbon vapors through said catalyst tubes, means for interrupting the flow of said vapors in a selected number of tubes, means for revivifying the catalyst in said selected tubes by forcing heated air therethrough simultaneously with the treatment of hydrocarbon gases in adjacent tubes whereby heat generated during said revivification in said selected tubes is transferred by radiation and convection to said catalyst employed in simultaneously treating said gases, and closure means at both ends of said tubes whereby the catalyst may be removed from and replaced in selected tubes when deteriorated beyond the point of regenerability while continuing the operation of the remaining tubes.

5. The apparatus of claim 4 wherein said chamber is provided with a header space at each end, through which said tubes pass and each tube is provided with a valved inlet into said header spaces controllable externally of said furnace.

6. The apparatus of claim 4 wherein said catalyst tubes are arranged in parallel banks in an elongated chamber between two headers, the ends of the tubes of each bank are in communication with an inlet and an outlet manifold, respectively and said inlet manifold is joined by separate valved connections to a hydrocarbon vapor supply line and also to a heated air supply line.

7. The apparatus of claim 4 wherein the said catalyst tubes are surrounded by mercury, liquid and vapor, means are provided for conducting mercury vapor to a condensing apparatus for utilizing the heat contained therein and means are provided for returning condensed mercury to said catalytic conversion apparatus.

8. In an apparatus for converting heavy hydrocarbon oils into gasoline wherein the vapors of said hydrocarbon oils are contacted with a granular catalyst at an elevated temperature, the said vapors are removed and fractionated to recover the gasoline therefrom and the said catalyst is periodically regenerated by interrupting the flow of hydrocarbon vapors in contact therewith and then passing oxygen-containing regenerating gas therethrough, the improvement comprising a plurality of adjacent vertical parallel tubes in direct thermal communication in which said catalyst is disposed, closable openings at upper and lower ends of said tubes for introducing and discharging catalyst, common headers adjacent opposite ends of said tubes and communicating therewith for introducing and discharging hydrocarbon vapors into and through said tubes, and closure means for independently discommunicating selected tubes from said headers without interrupting the flow of the hydrocarbon vapors in adjacent tubes.

9. Apparatus for catalytic hydrocarbon conversion comprising a plurality of substantially straight, substantially vertical catalyst tubes in direct thermal communication, a single fluid inlet header for said tubes, a single fluid outlet header for said tubes, valve means selectively connecting said tubes with said headers and operable while said apparatus is in use, said valve means being out of alignment with said tubes, individual closures above and aligned with each of said tubes for charging catalyst thereto and individual closures below and aligned with each of said tubes for discharging catalyst therefrom.

MORRIS T. CARPENTER.